United States Patent [19]

Krohn

[11] Patent Number: 5,005,159
[45] Date of Patent: Apr. 2, 1991

[54] CONTINUITY LOGGING USING DIFFERENCED SIGNAL DETECTION

[75] Inventor: Christine E. Krohn, Houston, Tex.

[73] Assignee: Exxon Production Research Company, Houston, Tex.

[21] Appl. No.: 430,513

[22] Filed: Nov. 1, 1989

[51] Int. Cl.$^5$ .............................................. G01V 1/40
[52] U.S. Cl. ........................................ 367/57; 367/33
[58] Field of Search .................. 181/102, 101; 367/25, 367/33, 57, 58, 59, 34, 31, 86

[56] References Cited

U.S. PATENT DOCUMENTS

| | | | |
|---|---|---|---|
| 2,989,135 | 6/1961 | Pierce, Jr. et al. | 367/57 |
| 3,352,375 | 11/1967 | Krey | 367/75 |
| 3,371,310 | 2/1968 | Silverman | 367/57 |
| 3,858,167 | 12/1974 | Stas et al. | 367/75 |
| 4,214,226 | 7/1980 | Narashimhan et al. | 367/27 |
| 4,298,967 | 11/1981 | Hawkins | 367/57 |
| 4,351,035 | 9/1982 | Buchanan et al. | 367/14 |
| 4,718,048 | 1/1988 | Staron et al. | 367/40 |
| 4,751,688 | 6/1988 | Paulsson | 367/36 |
| 4,783,771 | 11/1988 | Paulsson | 367/57 |

OTHER PUBLICATIONS

"Channel Waves as a Tool of Applied Geophysics in Coal Mining", Theodore C. Krey, *Geophysics*, Oct. 1963, pp. 701–714.

*Primary Examiner*—Ian J. Lobo
*Attorney, Agent, or Firm*—Vaden, Eickenroht, Thompson & Boulware

[57] ABSTRACT

A method of determining the continuity of a lithographic layer located between two vertical boreholes is disclosed. A seismic source is lowered in the first borehole while simultaneously a receiver pair, preferably a pair of "vertical" geophones spaced apart by about two feet, are lowered in the second borehole to develop a "differenced signal". The recording of high amplitude signals within a layer is an indication of a continuous, low velocity layer. The middle of a layer can also be discovered using a single vertical receiver and finding the place of phase reversal.

19 Claims, 4 Drawing Sheets

CONTINUITY LOGGING USING DIFFERENCED SIGNAL DETECTION

BACKGROUND OF THE INVENTION

1. Field of the Invention

This invention pertains to continuity logging and more particularly to the detection of guided waves in lithographic layers located between two well bores as a measure of continuity.

2. Description of the Prior Art

Well logging by utilizing various devices is a time honored means of recording physical measurements of the formations transversed by the borehole as a function of depth in the hole. These measurements are commonly used to identify the formations and to determine the amount and type of fluid in the formations. Such measurements are typically restricted to the region immediately adjacent to the well bore.

In addition to well-logging techniques, well bores have also been used in seismic exploration. The majority of seismic gathering procedures utilize the positioning of seismic sources and receivers on the land surface or in shallow, below-surface locations. However, when they are available, well bores have been employed in seismic exploration activity since there are some advantages afforded by having a well bore in existence. Probably the main advantage is the ability to place the source or the receiver or both closer to the reflecting geological interfaces than is possible from using surface locations alone.

When more than one borehole exist, then it is possible to utilize spaced apart boreholes for seismic exploration not possible with a single borehole. For example, U.S. Pat. No. 4,214,226, Narasimhan, et al., issued July 22, 1980, describes a procedure for producing a tomograph of the subsurface structure between boreholes by placing spaced geophones in one borehole and by producing a sequence of shots at spaced apart locations in the other borehole. The arrival times or amplitudes for transmitted primary (compressional) waves which travel directly between shot and geophone pairs are used to produce an image of the structure between the boreholes. In another example, U.S. Pat. No. 4,298,967, Hawkins, issued Nov. 3, 1981 a procedure for providing a horizontal profile of a reflector located between boreholes by using multiple shot and receiver positions in the boreholes. In this case, the arrival times from reflected primary waves which travel from the source to the reflector and then to the geophones are used to image the reflector.

Another type of subsurface seismic exploration involves placing sources and receivers within a coal seam and along roadways in mines. In this application, guided waves, which are trapped within the coal, and which are typically called seam waves or channel waves, are used to determine the location of faults in the seam. Unlike body waves such as primary and secondary (compressional and shear) waves, guided waves are confined in space. These guided waves are trapped in low-velocity layers such as coal by critical reflections of the wave at the upper and lower boundaries of the layers. Because these guided waves have their largest amplitudes in the coal, they can be used to investigate discontinuities in the coal. Guided waves are often used to measure discontinuities in three-foot coal seams even though the wavelength of the body waves generated from the same source may be 100 feet long. The resolution of seismic imaging using body waves is limited to one half of a wavelength which is often much larger than the coal seam.

A number of techniques have been developed to enhance the detection of guided waves in coal seams. These techniques require the detectors to be deployed in a mine at specific location within the coal layer. For example, U.S. Pat. No. 3,352,375, Krey, issued Nov. 14, 1976, uses geophone pairs with one geophone located near the upper boundary of the seam and the other located near the lower boundary of the seam. The signals from the two geophones in each pair are subtracted. In another patent, U.S. Pat. No. 3,858,167, Stas, et al., issued Dec. 31, 1974; the geophones are located in the center of the seam and oriented in a specific direction to provide maximum sensitivity to the seam waves. The technique described in U.S. Pat. No. 4,351,035, Buchanan, et al., issued Sept. 21, 1982, requires an array of geophones located along a roadway to generate a holograph of the seam.

The development of a procedure for ascertaining the existence of continuity in one or more layers as opposed to discontinuity existing in other layers can be extremely useful for both exploration and production of oil and gas. In exploration, for example, continuity logging can be useful for constructing geologic models, correlating formation properties between boreholes, and determining the presence of faults. In production, continuity logging can be used to indicate the continuity of the reservoir between the boreholes and the presence of permeability barriers. In addition, continuity logging can be useful in planning the mining of coals and other minerals.

Therefore, it is a feature of the present invention to provide an improved method of detecting the presence of a continuous layer between boreholes in the subterranean lithography therebetween.

It is another feature of the present invention to provide an improved method of detecting the presence of guided waves in specific lithographic layers as a means of determining the continuity of such layers.

SUMMARY OF THE INVENTION

The preferred method of continuity logging in accordance with the present invention involves the utilization of two boreholes spaced apart and progressing downwardly past the lithography to be explored by continuity logging. A seismic source is located in the first borehole in the vicinity of low-velocity layers in the lithography as previously determined, such as from previous conventional logging of the well. Such layers are generally less dense or more porous than the layers on either side. At the same time a combination of two substantially identical geophone receivers are lowered into the second borehole, the two geophones being fixed together a short distance apart, normally at a distance of about two feet. Therefore, in the borehole, one receiver is located about two feet above the other.

Seismic sources can either be the kind that produces a continuous acoustic wave over a relatively long period of time or preferably the kind that can be repeatedly triggered to produce a pulse-like seismic signal. In either event, for purposes herein the produced wave motion imparted into the formation will be referred to as producing "impulses". Suitable seismic sources for practicing the invention are well-known in the art.

The electrical signal output of the two receivers are combined so that the output of one is subtracted from the other, thereby producing a "differenced signal". The source is lowered in the first borehole to be located opposite a first layer and the receiver combination is lowered in the second borehole about the same distance so as to be presumptively located opposite the same layer. The source is then actuated. The differenced signal that is produced by the two-receiver combination reduces the values of the individual body waves (both primary and secondary waves) that are present while enhancing the presence of guided waves. Thus, if there is an appreciable signal present or detected, it is an indication of the presence of guided waves, and, hence, the presence of continuity in the layer. If, on the other hand, there is only a small differenced signal present or none at all, then there is no or a negligible amount of wave guide action present, and hence there is discontinuity in the layer. The entire range of low-velocity layers can be surveyed in like fashion by simultaneously lowering the source and receiver combination in their respective borehole and repeating the above procedure.

When vertical motion sensing geophones or other receivers are employed for the two receivers in the receiving combination, some additional information is provided. A vertical motion sensing geophone is sensitive to the detection of a symmetric guided wave that oscillates in the formation in such a fashion that a null or zero-crossover point appears in the layer at about its mid-point (assuming a homogeneous layer). Therefore, when such geophones are used for developing the guided wave differenced signal as noted above, a phase reversal will occur in such signal when one of the geophones is lowered past the mid-point of continuous low-velocity layer. Thus, not only can the presence of the layer be determined, but its mid-point can be determined by the presence of polarity or phase reversal.

BRIEF DESCRIPTION OF THE DRAWINGS

So that the manner in which the above-mentioned features, advantages and objects of the invention, as well as others which will become apparent, are attained and can be understood in detail, more particular description of the invention briefly summarized above may be had by reference to the embodiments thereof which are illustrated in the drawings, which drawings form a part of this specification. It is to be noted, however, that the appended drawings illustrate only preferred embodiments of the inventions and are therefore not to be considered limiting of its scope as the invention may admit to other equally effective embodiment. In the drawings.

DESCRIPTIONS OF THE PREFERRED EMBODIMENTS

Definitions of "body waves" and "guided waves" are set forth below as aids in understanding the invention herein described.

Body waves are defined as disturbances which can travel throughout a medium. Body waves are not confined in space. In a solid medium, two types of body waves can exist: namely, compressional waves and shear waves. One type of wave which is not a body wave is a surface wave; the amplitudes of surface waves decrease rapidly with distance from the surface.

Under certain circumstances wave energy may be trapped within a layer which is then known as a wave guide. Guided waves have normal amplitudes in such layer, whereas the amplitudes in the material surrounding the layer rapidly approach zero with increasing distance from the layer. The guided waves can be trapped or partially trapped in a low-velocity layer by critical reflections of the waves at the upper and lower boundaries of the layer. Because guided waves have their largest amplitudes in the low-velocity layer, they can be used to investigate discontinuities in the layer. Guided waves are used to measure discontinuities in three-foot coal beds even though the wavelength may be 100 feet long. In coal geophysics, these guided waves are often called seam waves or channel waves.

Figure 1:
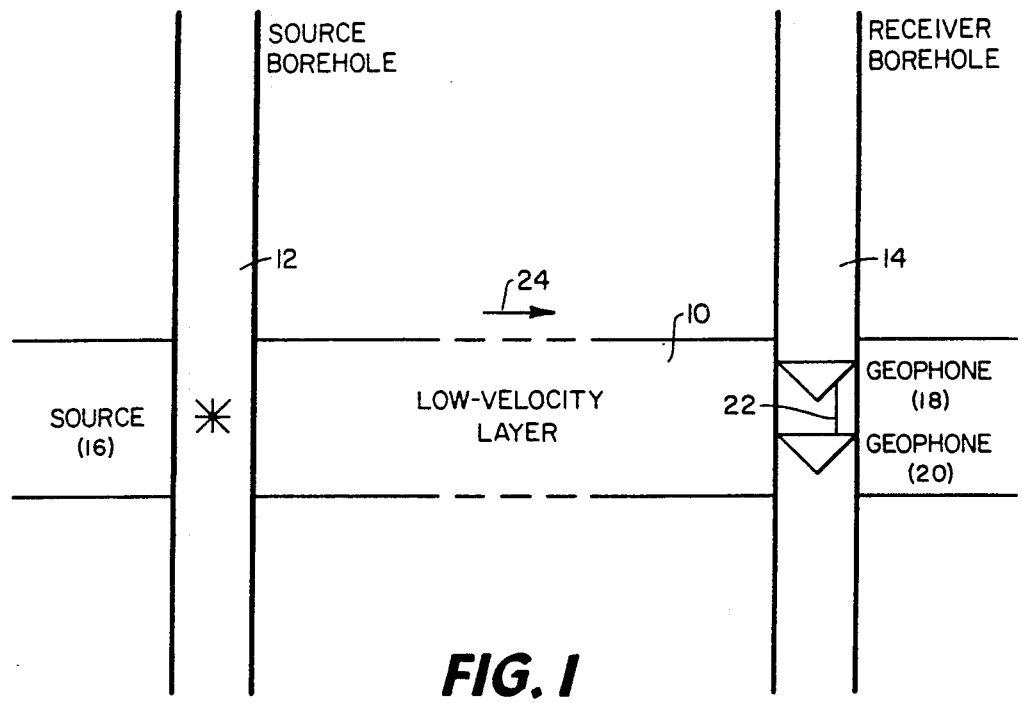
FIG. 1 is a schematic representation of two boreholes utilized for continuity logging a low velocity lithographic layer therebetween in accordance with a preferred procedure of the present invention, wherein a seismic source is located in a first borehole and two spaced apart geophones are located in a second borehole.
Figure 2A:
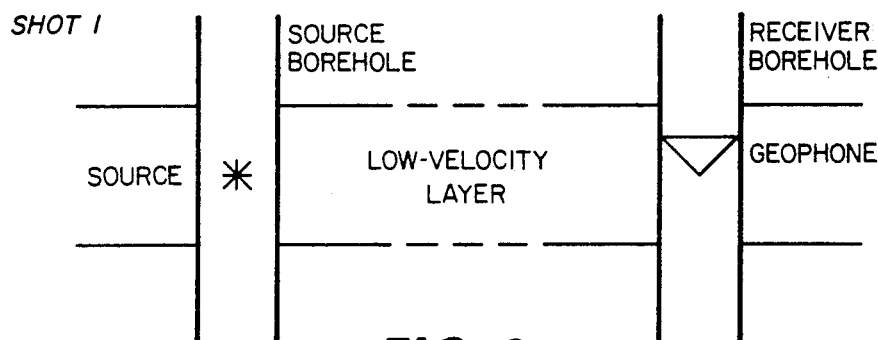
FIGS. 2a and 2b are schematic representations of two boreholes utilized for continuity logging a low velocity lithographic layer therebetween in accordance with an alternate preferred procedure of the present invention, wherein a seismic source is located in a first borehole and a single geophone receiver is located in a second borehole at a first location during a first sourcing event and at a second location during a second sourcing event.
Figure 2B:
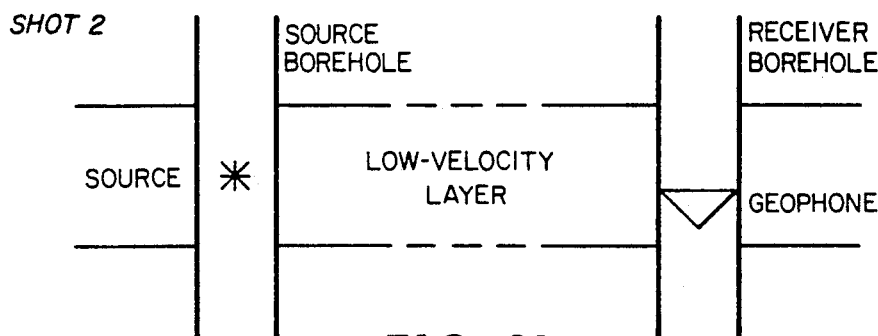

Now referring to the drawings, and first to FIG. 1, a low-velocity layer or coal seam 10 is shown between a source borehole 12 and a receiver borehole 14. The boreholes are spaced at a distance from each other of several hundred feet, for example, 2000 feet. The low-velocity layer is known to exist, at least approximately, from existing well logging or other data at the depth shown. For purposes of illustration, the low-velocity layer sustains seismic waves travelling therein at 9900 ft/sec., whereas all other layers in the vicinity sustain seismic waves from the same source at faster velocities.

Seismic source 16 in borehole 12 is a typical mechanical seismic source, such as a vibrator, that can be actuated upon command in traditional fashion well-known in the art to established acoustic waves in the layers adjacent borehole 12 where the source is located. Geophones 18 and 20 are located in borehole 14 at approximately the same depth as source 16 at any given time. Each time the source is actuated the source imparts substantially the same signal into the formation, these wave travelling in the intervening layers between the boreholes.

Geophones 18 and 20 both include a motion sensitive sensing or receiving element of the same kind. That is, both are either "horizontal" geophones or "vertical" geophones, depending on the directionality of the sensing element. The two geophones are spaced apart by a linkage 22 so as to maintain the two geophones at the same separation. Typically, the separation is two feet. Ordinarily, each geophone develops an electrical voltage signal representative of the acoustical wave that is sensed by the geophone. In discussing the wave patterns presented in FIGS. 3–4 and 6–7 below, it is assumed that only one geophone is operational. However, in accordance with the invention, both geophones are operable and are electrically connected in such a manner that the output of one of the geophones is subtracted from the other. This signal development produces a "differenced signal", as more completely discussed below with respect to the discussion of FIGS. 5 and 8.

Figure 3:
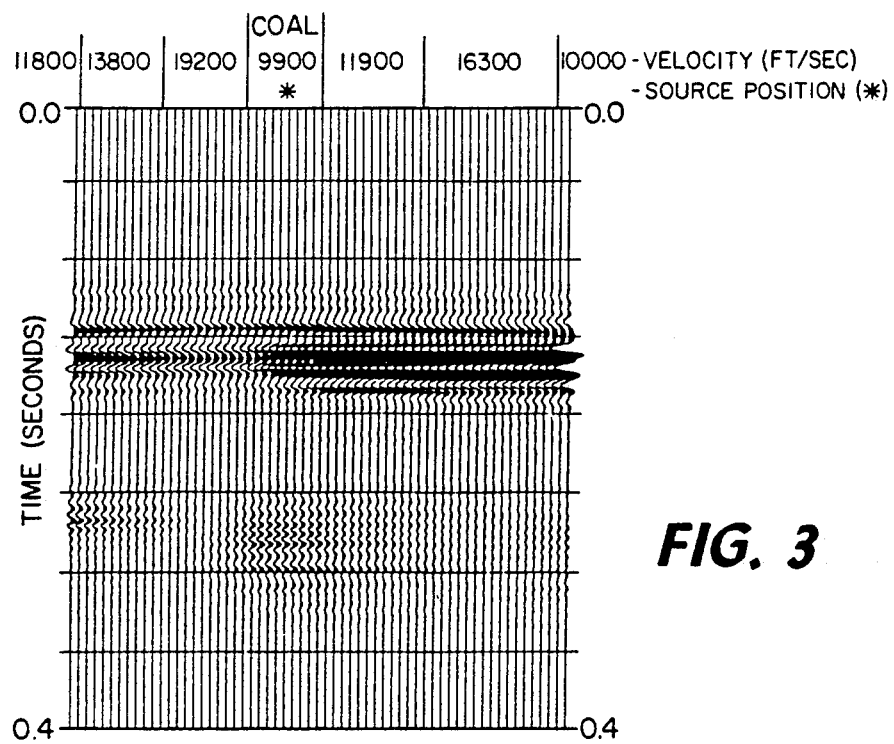
FIG. 3 is a representation of wave data developed between boreholes in a typical coal lithographic structure using as a receiver a horizontal motion sensitive geophone.

Now referring to FIG. 3, a wave pattern development is shown as it relates to a signal produced by a single horizontal geophone, oriented for receiving waves in line with direction 24 established by boreholes 12 and 14. The boreholes are known to be 1940 feet apart. A low velocity layer is known to be within 60 or so feet represented by the diagram. That is, each vertical line separation represents a distance of one foot. The velocity characteristics of the layers traversed over the range of inquiry are shown at the top of the diagram in feet per second, although it is assumed that these layers are not precisely known in the beginning. What is known is that a low velocity layer of interest lies somewhere within the overall range.

The source and the receiver are located in their respective boreholes at the same approximate depths and sourcing is initiated. In this case, there is only one operable receiver and that receiver is a "horizontal" geophone. The receiver output recording is shown for the first depth on the left side of the drawing. The source remains fixed in the layer and the receiver is lowered one foot and the source is again actuated to produce a signal on the second line. This procedure continues for each successive line until the whole diagram is developed.

There are two series of waves developed, the first of which can be identified with the primary (compressional) waves and the second with the secondary (shear) waves. There is no significant difference in appearance of the low velocity layer in the middle and that of the neighboring layers. That is, the signals recorded for the low velocity layer are quite similar to those recorded above and below the layer and the layer is not readily identified.

Figure 4:
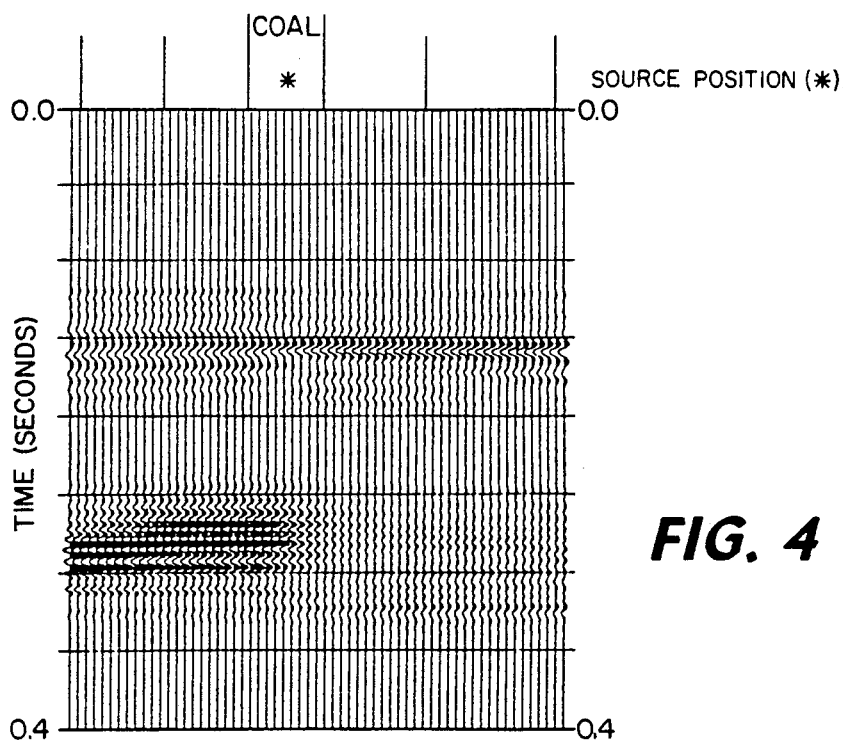
FIG. 4 is a representation of wave data developed between boreholes in the same coal lithographic structure as depicted in FIG. 3 using as a receiver a vertical motion sensitive geophone.

FIG. 4 is developed in the same manner as FIG. 3, except a "vertical" geophone is employed as the receiver. Again, there are two groups of wave patterns, but the appearance of the patterns are not significantly different for the low velocity layer and the layer above and the layer below such layer. It may be seen, however, that there is a phase reversal in the middle that approximately identifies the low velocity layer. Moreover, as will be seen, this part of the signal will be enhanced when the differenced signal is developed.

Figure 5:
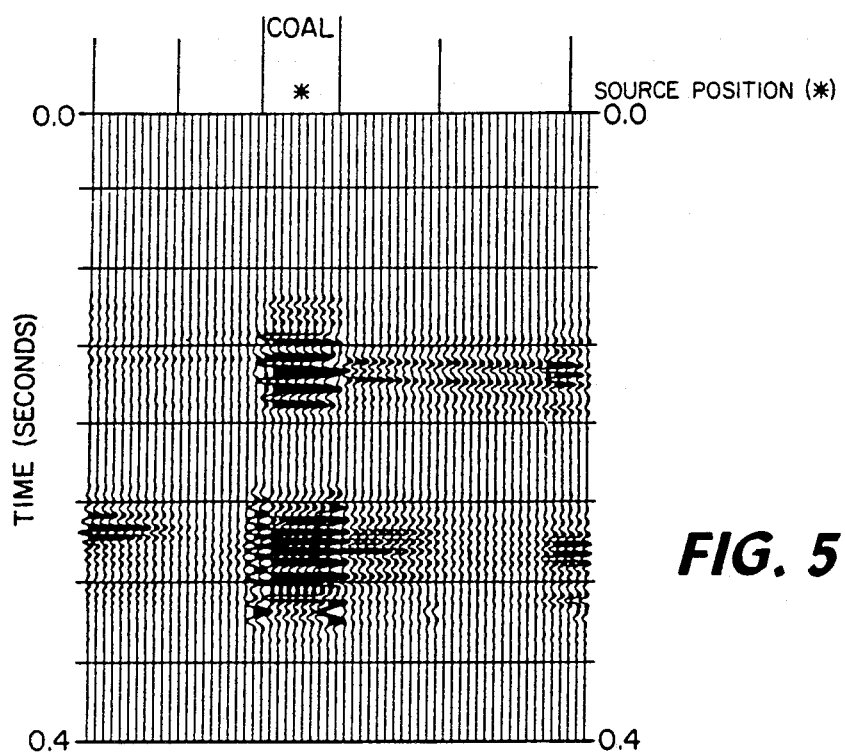
FIG. 5 is a representation of wave data developed between boreholes in the same coal lithographic structure as depicted in FIG. 3 using as a receiver combination two vertically spaced apart, vertical motion sensitive geophones.

Now referring to FIG. 5, a series of signals are developed in much the same manner as for FIGS. 3 and 4, except that in this case, two "vertical" geophones connected together two feet apart are used as a single receiver, the output therefrom being the "differenced signal". The low velocity layer is now sharply defined for both set of waves. Furthermore, the entire boundary of the layer is defined, not just the middle or center thereof. What is shown by the diagram is not just that there is a low velocity layer in the middle but that layer sustains the waves and therefore indicates continuity of the layer.

Figure 6:
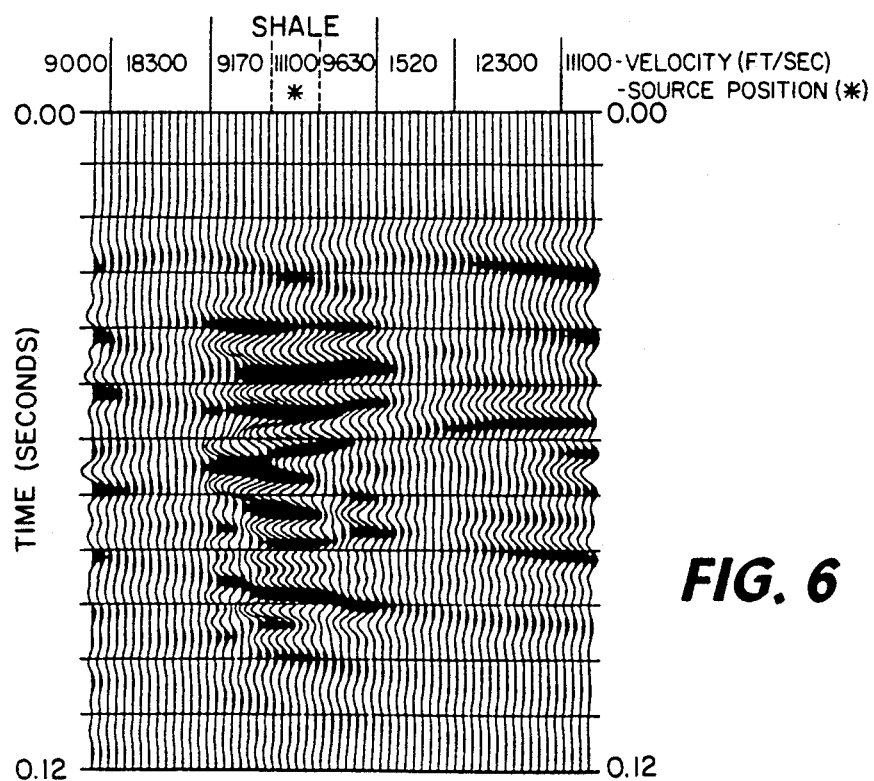
FIG. 6 is a representation of wave data developed between boreholes in a typical shale lithographic structure using as a receiver a horizontal motion sensitive geophone.
Figure 7:
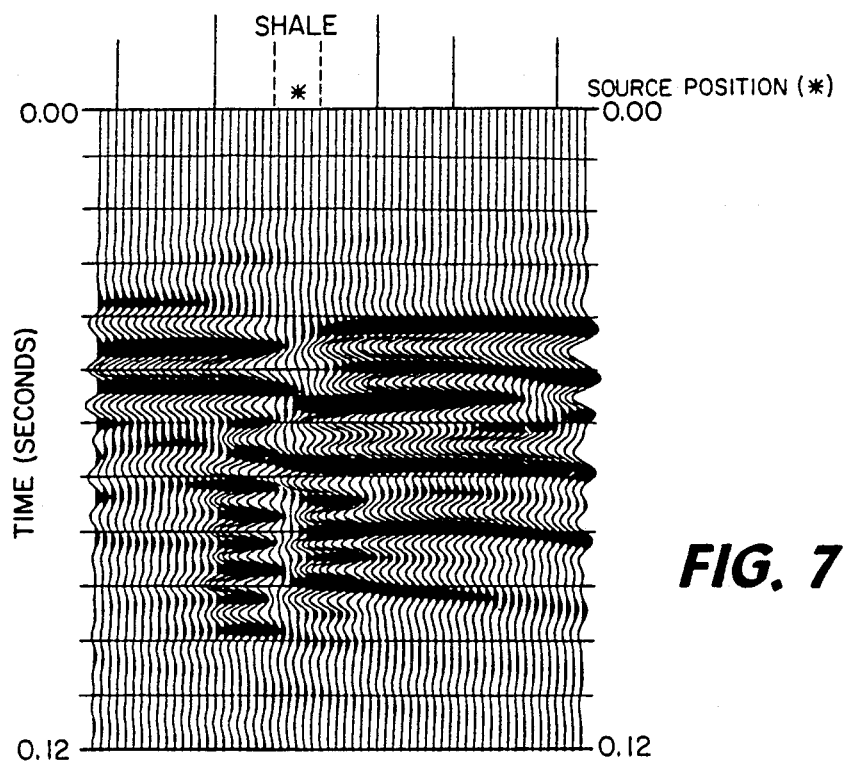
FIG. 7 is a representation of wave data developed between boreholes in the same shale lithographic structure as depicted in FIG. 6 using as a receiver a vertical motion sensitive geophone.
Figure 8:
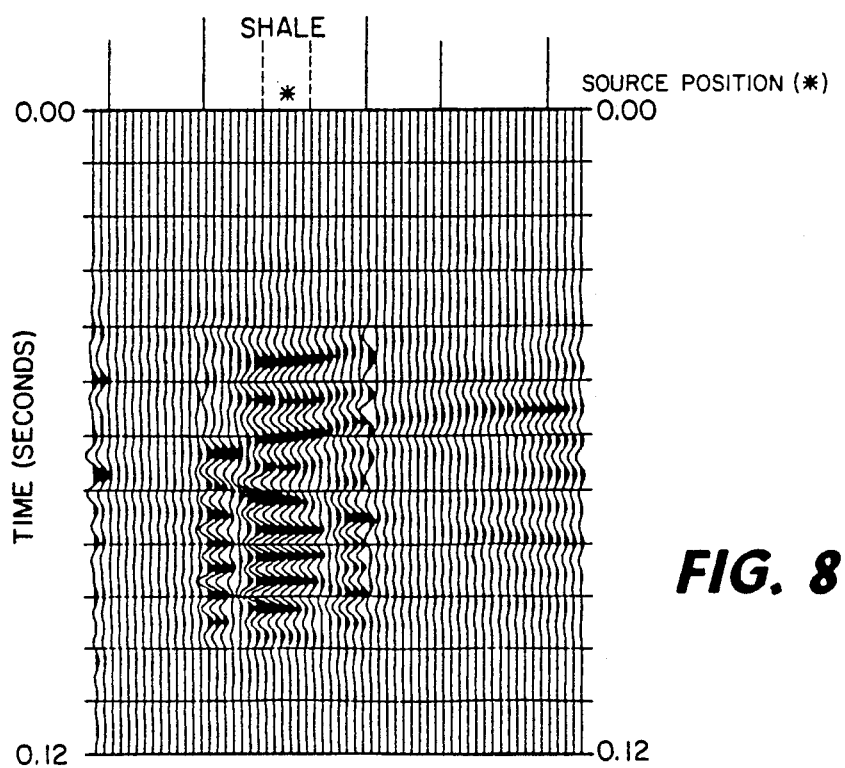
FIG. 8 is a representation of wave data developed between boreholes in the same shale lithographic structure as depicted in FIG. 6 using as a receiver combination two vertically spaced apart, vertical motion sensitive geophones.

A similar series of diagrams to that of FIGS. 3, 4, and 5 are shown in FIGS. 6, 7 and 8. In the latter case, the structure under investigation is a shale structure, rather than a coal structure. In this case the source borehole and the receiver borehole are only about 300 feet apart. Thus, the primary and secondary waves are not separated in time. Otherwise, the conditions are the same. That is, FIG. 6 shows the results of using a single horizontal geophone as the receiver; FIG. 7 shows the results of using a single vertical geophone; and FIG. 8 shows the results of using a pair of vertical geophones spaced apart at a two-foot distance, the output being the differenced signal. In the case of a shale layer, the velocity characteristics of the entire layer may not be homogeneous; however, the shale is comprised of lower velocity material than its neighboring layers. Therefore, as is true for the coal model, the large differenced signals for the shale model also sharply define the edges of the layer (FIG. 8) in a manner not evident by the single receiver diagrams (FIGS. 6 and 7). Furthermore, each of the three sublayers of the principally detected layer are also identified.

It should be noted that the data shown in FIGS. 3–8 was actually recorded with the source fixed in one location, with the receiver being located at different positions or locations relative to the layer. This demonstrates that the technique described herein is able to distinguish cases where the source is in the layer but the receivers are not in the layer. This is important because the location of the layer may not be precisely known. Moreover, the layer can in some cases intercept the boreholes at different depths rather than at the same depth, as heretofore assumed.

Referring back to FIGS. 4 and 7, it will be seen that the single vertical geophone in each case develops a phase reversal in the approximate center or mid-section of the detected layer. Thus, by the series of signals, one is able to distinguish the boundaries and the center section of the continuous low velocity layers in the formation.

Although FIGS. 5 and 8 were developed using vertical geophones, similar diagrams are possible by using a pair of horizontal geophones. A vertical pair is preferred, however, because they do not specifically have to be aligned in their respective horizontal orientations to be in line with the formation direction between the boreholes.

Moreover, hydrophones or receivers having pressure sensing elements could also be employed, if desired, under proper environmental conditions for their operations, such as with a fluid-filled borehole.

While two particular preferred embodiments of the invention have been shown and described, it will be understood that the invention is not limited thereto, since many modifications may be made and will become apparent to those skilled in the art.

What is claimed is:

1. Method of continuity logging guided waves in the lithographic region located between two boreholes, comprising seismic sourcing at a first depth location in a first borehole, receiving the direct impulses from said sourcing at about the same first depth location in a second borehole at each a first seismic receiver and a second seismic receiver vertically separated a short distance therefrom and developing a differenced signal value representative of the difference in the respective signal values produced by said first and second receivers, seismic sourcing at subsequent discrete depth locations in said first borehole, and for each respective subsequent seismic sourcing, receiving the direct impulses from said sourcing at about the same depth location in said second borehole as the seismic sourcing depth location at each said first seismic receiver and said second seismic receiver, and developing a differenced signal value representative of the difference in the respective signal values produced by said first and second receivers, wherein an appreciable differenced signal at a specific depth indicates the presence of guided waves in a continuous low-velocity lithographic layer at such specific depth.

2. Method of continuity logging in accordance with claim 1, wherein said first and second seismic receivers each includes a vertical seismic motion sensing element.

3. Method of continuity logging in accordance with claim 1, wherein said first and second seismic receivers each includes a horizontal seismic motion sensing element.

4. Method of continuity logging in accordance with claim 1, wherein said first and second seismic receivers each includes a pressure sensing element.

5. Method of continuity logging in accordance with claim 1, and including clamping said first and second receivers a fixed distance apart.

6. Method of continuity logging in accordance with claim 5, wherein said fixed distance is approximately two feet.

7. Method of continuity logging in accordance with claim 1, wherein the same source is employed for each seismic sourcing event and the same first and second receivers are employed for each receiving event.

8. Method of continuity logging in accordance with claim 1, wherein said respective sourcing and receiving events employ respectively different sources and first and second receivers.

9. Method of continuity logging in accordance with claim 8, wherein said respective sourcing and receiving events occur substantially simultaneously.

10. Method of continuity logging in accordance with claim 1, wherein the vertical separation of respective sourcing events is approximately one foot.

11. Method of continuity logging in accordance with claim 1, wherein said first and second receivers include vertical seismic motion sensing elements, the presence of a phase shift in said guided waves from one depth location to the next indicates the crossing of the midpoint in the related continuous low-velocity lithographic layer.

12. Method of continuity logging in accordance with claim 1, wherein said first and second receivers include vertical seismic motion sensing elements, the presence of a phase shift in the differenced signal from one depth to the next validates the presence of guided waves at these two depths.

13. Method of continuity logging guided waves in the lithographic region located between two boreholes, comprising (a) first seismic sourcing at a first depth location in a first borehole, (b) first receiving the direct impulses from said first depth location in a second borehole at a seismic receiver and developing a first signal value, (c) second seismic sourcing at said first depth location in said first borehole in substantially the same manner as said first seismic sourcing, (d) second receiving the direct impulses from said second sourcing at a depth location in said second borehole a predetermined short vertical distance from the location of said first receiving at said seismic receiver and developing a second signal value, (e) developing a differenced signal by subtracting one of said first and second signals from the other, and (f) at subsequent discrete depth locations in said respective first and second boreholes, repeating steps (a) through (e), wherein an appreciable differenced signal at a specific depth indicates the presence of guided waves in a continuous low-velocity lithographic layer at such specific depth.

14. Method of continuity logging in accordance with claim 13, wherein said seismic receivers each includes a vertical seismic motion sensing element.

15. Method of continuity logging in accordance with claim 13, wherein said seismic receivers each includes a horizontal seismic motion sensing element.

16. Method of continuity logging in accordance with claim 13, wherein said seismic receivers each includes a pressure sensing element.

17. Method of continuity logging in accordance with claim 13, wherein the vertical separation of respective sourcing events is approximately one foot.

18. Method of continuity logging in accordance with claim 13, wherein said receivers include vertical seismic motion sensing elements, the presence of a phase shift in said guided waves from one depth location to the next indicates the crossing of the mid-point in the related continuous low-velocity lithographic layer.

19. Method of continuity logging in accordance with claim 13, wherein said receivers include vertical seismic motion sensing elements, the presence of a phase shift in the differenced signal from one depth to the next validates the presence of guided waves at these two depths.

* * * * *